United States Patent
Larsson

(10) Patent No.: US 10,029,811 B2
(45) Date of Patent: Jul. 24, 2018

(54) STRIP SPLICING

(75) Inventor: Ingemar Larsson, Fjällbacka (SE)

(73) Assignee: TETRA LAVAL HOLDINGS & FINANCE S.A., Pully (CH)

( * ) Notice: Subject to any disclaimer, the term of this patent is extended or adjusted under 35 U.S.C. 154(b) by 1240 days.

(21) Appl. No.: 13/380,325

(22) PCT Filed: May 25, 2010

(86) PCT No.: PCT/SE2010/000141
§ 371 (c)(1),
(2), (4) Date: Dec. 22, 2011

(87) PCT Pub. No.: WO2010/151200
PCT Pub. Date: Dec. 29, 2010

(65) Prior Publication Data
US 2012/0112422 A1    May 10, 2012

(30) Foreign Application Priority Data
Jun. 24, 2009    (SE) .................... 0900861

(51) Int. Cl.
*F16J 15/02*    (2006.01)
*B32B 37/02*    (2006.01)
(Continued)

(52) U.S. Cl.
CPC ............... *B65B 9/20* (2013.01); *B31F 5/00* (2013.01); *B31F 7/004* (2013.01);
(Continued)

(58) Field of Classification Search
CPC ......... B31B 1/64; B31B 3/64; B31B 2201/60; B31B 2201/6026; B31B 2201/6039;
(Continued)

(56) References Cited

U.S. PATENT DOCUMENTS 2,395,352 A * 2/1946 Staude et al. .............. 493/67
2,445,807 A * 7/1948 Summers et al. .......... 451/531
(Continued)

FOREIGN PATENT DOCUMENTS

EP    80729 A1 * 6/1983
ET    1 884 349    2/2008
(Continued)

OTHER PUBLICATIONS

International Search Report (PCT/ISA/210) dated Sep. 23, 2010, by Swedish Patent Office as the International Searching Authority for International Application No. PCT/SE2010/000141.
(Continued)

*Primary Examiner* — Vishal A Patel
*Assistant Examiner* — Stacy N Warren
(74) *Attorney, Agent, or Firm* — Buchanan Ingersoll & Rooney PC

(57) ABSTRACT

The present invention concerns a method of splicing two sealing strips and a sealing strip formed by the method. The sealing strip is placed at longitudinal edges of a packaging material web, used for packaging containers for liquid foods. The sealing strips to be spliced are cut each forming an oblique edge of about 45°, as seen in plan view. The oblique edges are then placed one on top of the other forming an overlapping area. The overlapping area is in the form of an oblique band having a length of about 3 mm. The ends of the sealing strips are then fused together by heating both from one side at the overlapping area.

11 Claims, 2 Drawing Sheets

(51) Int. Cl.
  *B32B 38/10* (2006.01)
  *B65B 9/20* (2012.01)
  *B31F 7/00* (2006.01)
  *B31F 5/00* (2006.01)
  *B29C 65/00* (2006.01)
  *B31B 50/74* (2017.01)

(52) U.S. Cl.
  CPC ....... *B29C 66/1122* (2013.01); *B29C 66/1142* (2013.01); *B29C 66/43* (2013.01); *B29C 66/4322* (2013.01); *B31B 50/743* (2017.08)

(58) Field of Classification Search
  CPC .......... B31B 2219/60; B31B 2219/603; B31B 2219/6061; B29C 66/43; B29C 66/4322; B29C 66/1122; B29C 66/02241; B31F 5/06
  USPC ................ 277/631; 220/677, 678, 679, 680; 156/157, 159, 304.5, 304.6, 308.4, 309.6
  See application file for complete search history.

(56) References Cited

U.S. PATENT DOCUMENTS

| | | | | |
|---|---|---|---|---|
| 3,504,710 | A | * | 4/1970 | Pancoast ........................ 138/170 |
| 3,542,627 | A | | 11/1970 | Osmalov et al. |
| 4,117,188 | A | * | 9/1978 | Takahashi et al. .......... 428/35.8 |
| 4,983,241 | A | | 1/1991 | Sawada et al. |
| 5,305,560 | A | * | 4/1994 | Roelofs ........................ 451/531 |
| 5,370,756 | A | * | 12/1994 | Buis et al. ....................... 156/71 |
| 5,455,136 | A | * | 10/1995 | Yu ............................ G03G 5/10 399/162 |
| 6,013,152 | A | * | 1/2000 | Hasegawa et al. ............ 156/258 |
| 6,530,409 | B1 | * | 3/2003 | Ishikawa et al. ............. 152/506 |
| 6,982,018 | B1 | * | 1/2006 | Henry ........................... 156/73.4 |
| 2003/0173022 | A1 | * | 9/2003 | Futase .......................... 156/251 |
| 2005/0155987 | A1 | | 7/2005 | Py et al. |
| 2007/0023133 | A1 | * | 2/2007 | Roetker et al. ............... 156/217 |
| 2008/0038025 | A1 | * | 2/2008 | Zaretsky .............. G03G 15/162 399/308 |
| 2008/0067168 | A1 | * | 3/2008 | Andersson et al. .......... 219/633 |

FOREIGN PATENT DOCUMENTS

| | | | |
|---|---|---|---|
| GB | 2 258 927 | | 2/1993 |
| JP | 8-104340 A | | 4/1996 |
| JP | 8-324600 A | | 12/1996 |
| JP | 2003118708 A | * | 4/2003 |
| JP | 2003-327620 A | | 11/2003 |
| JP | 2004307760 A | | 11/2004 |
| JP | 2005-535530 A | | 11/2005 |
| JP | 2006117247 A | | 5/2006 |
| JP | 2008-512317 A | | 4/2008 |

OTHER PUBLICATIONS

Extended Search Report issued by the European Patent Office dated May 22, 2015 in corresponding European Application No. 10792404.5. (7 pages).

Office Action issued by the Japanese Patent Office dated Oct. 20, 2015 in corresponding Japanese Application No. 2012-517443, and English language translation of Office Action (6 pages).

* cited by examiner

- Prior Art -

STRIP SPLICING

TECHNICAL FIELD

The present invention relates to a method of splicing a sealing strip to be used in packaging containers. It also relates to a sealing strip being spliced in accordance with the method.

BACKGROUND ART

Packaging containers for liquid foods, such as milk and juice, are produced with the aid of modern, rational filling machines which, either from a web or from prefabricated sheets of a packaging laminate, form, fill and seal the packages.

Examples of common packaging containers for milk, juice and other liquid foods are Tetra Brik, Tetra Rex and Tetra Top (all registered trademarks).

From, for example, a web of the packaging material, parallelepipedic packaging containers of the Tetra Brik type are produced in that the web is first reformed into a tube by both opposing longitudinal edges of the web being folded towards and, by thermosealing, permanently united to one another in a liquid-tight overlap joint. The tube is filled with the pertinent contents, for example milk, at the same time as the tube is divided into continuous, filled cushion-shaped packaging units by repeated flat-pressing operations and sealings of the tube in transverse sealing zones across the longitudinal direction of the tube below the level of the contents in the tube. The packaging units are separated from one another by incisions in the transverse sealing zones and are given the desired geometric configuration, usually parallelepipedic, by inward folding and fixing of the double-walled triangular corner flaps against each respective adjacent planar packaging wall or panel. The finished packaging containers are thereafter discharged from the filling machine for further transport and handling.

In tetrahedral packaging containers the transverse sealing of the tube takes place substantially at right angles to the longitudinal direction of the tube and alternating in spaced apart relationship from each other in two planes at right angles to each other.

Conventional packaging containers of the above-described types are produced from a laminated packaging material comprising a rigid, but foldable, core or bulk layer of paper or paperboard and outer, liquid-tight coatings of thermoplastic, preferably polyethylene. For particularly foods sensitive to oxygen gas, such as for example, juice, wine and cooking oils, the packaging material moreover includes at least one additional layer by means of which the requisite tightness properties against oxygen are ensured.

In both the above types of package containers the longitudinal overlap joint which is formed on the tube entails that the incision surface of the inner longitudinal edge of the packaging material will be exposed to the contents of the package, which implies that the contents may readily be absorbed into the packaging material if this includes a fibrous material such as, for example, paper or paperboard. Another problem is that the contents of the package may come into contact with any possible metal layer in the packaging material.

To avoid direct contact between the incision edge and the contents of the package a sealing strip is applied and fixed in the filling machine along one longitudinal edge of the packaging material web, so that it has a free strip edge projecting from the longitudinal edge. The planar packaging material web provided with the strip is then reformed into a tube in that, as was described above, both of the longitudinal edges of the web are folded towards and permanently united to one another in an overlap seal or joint. During the tube forming operation in the filling machine, the projecting free strip edge is folded into planar abutment against the overlapping inside of the second longitudinal web edge and is fixedly sealed thereto by thermosealing in such a manner that the incision edge of the first longitudinal web edge facing towards the interior of the tube is completely covered and protected against liquid penetration (edge wicking).

In order to give protection against liquid penetration, the sealing strip must thus be thermosealable to counterfacing sealing surfaces of the packaging material and an additional requirement is that the thermosealing must be capable of being carried out in an efficient and expedient manner even at the extremely high production output speeds at which today's modern filling machines operate. The sealing strip is normally laminated and may be made of many different materials.

One prior art sealing strip that is employed in a commercial packaging container of a packaging material comprising a paper- or paperboard layer and outer liquid-tight coatings of polyethylene, preferably low density polyethylene (LDPE) has a base layer of polyethylene terephthalate (PET) and outer, thermosealable plastic coatings of polyethylene, for example low density polyethylene (LDPE).

Another prior art sealing strip for a commercial packaging material of the above-described type has a base layer of polyethylene terephthalate (PET) and outer, thermosealable plastic coatings of metallocene polyethylene (mLLDPE) which, in comparison with low density polyethylene (LDPE) displays an advantageously wider sealing window than LDPE with a lower temperature limit that lies below the corresponding limit for LDPE.

A further prior art sealing strip comprises a base layer of a polymer possessing gas barrier properties which, on its one side, has a first sealing layer of polyethylene and, on its other side, has a second sealing layer of polyethylene. The first and second sealing layers may display a two layer structure consisting of an outer layer of a mixture of metallocene polyethylene (mLLDPE), low density polyethylene (LDPE) and/or a density-increasing polyethylene component and an inner layer of a mixture of low density polyethylene (LDPE) and/or a density-increasing polyethylene component.

In the production of the sealing strip it sometimes happens that the strip is broken. If that happens one often splices the ends of the strip in order to not having to discard larger lengths of the sealing strip. It is also possible to splice several, not broken, sealing strips, to increase the total length of the sealing strip formed. Today the normal method of splicing is to cut the free ends of the strips transversely as seen in plan view, i.e. 90° in relation to the longitudinal direction of the sealing strip. The free ends of the sealing strips are then placed on top of each other with an overlap of about 7-10 mm. The ends are then heated (welded), to fuse the ends together. One problem that may occur, depending on the skill of the operator, is that the overlap becomes too long and that the heating does not cover the total length of the overlap at the spliced area. If the heating does not cover the total overlap, the ends of the strip parts to be spliced may not be fused to the sealing strip, with the potential risk that the splice will disintegrate. In the overlapping area the sealing strip will have double thickness, giving an increased stiffness. The increased stiffness may have negative influence in the forming of packaging containers, in that the sealing strip does not bend smoothly.

There may also be problems if the overlapping area is placed at a crease line of the packaging material web.

BRIEF OUTLINE OF THE INVENTION

The present invention concerns a method of splicing a sealing strip. It also concerns a sealing strip being spliced according to the method of the present invention.

One object is to improve leakage proof of the strip splice. Another object is that the splice should not disturb the performance in the filling machine. The sealing strip should be performing even if it is placed over a crease line.

According to the present invention a method of splicing a sealing strip is accomplished. By this method the ends of the sealing strips are cut obliquely, whereby the free ends in one embodiment each form an angle of 45°, seen in plan view. The ends are then brought together with a minor overlap in the region of 3 mm. Heating is then applied from one side to the overlapping parts of the sealing strip.

In the splicing according to the prior art the sealing strip will have double thickness in the entire overlap area. In the splicing according to the present invention there will only be double thickness in a small band along the oblique splice. Thanks to the oblique splice and a relatively short overlap the splice of the present invention will be smoother than the splice of the prior art. For example a smooth overlap reduces the risk of having channel leaks across the strip. Tests have shown that the risk of leakage is reduced with 90% with the new splicing method according to the present invention compared with the previously used method.

In production of the sealing strips it is normal practice to cut a sealing strip having a relatively large width into a number of sealing strips having a smaller width. In one example one sealing strip is cut into 21 sealing strips advanced in parallel to each other. The present invention may be used irrespectively of the width of the sealing strip. It is also possible to splice a number of parallel sealing strips having a smaller width in one common procedure.

Further objects and advantage of the present invention will be obvious for a person skilled in the art reading the detailed description below of preferred embodiments.

BRIEF DESCRIPTION OF THE ACCOMPANYING DRAWINGS

The present invention will now be described in greater detail below, by way of an example and with reference to the accompanying drawings, in which.

DETAILED DESCRIPTION OF THE INVENTION

Figure 1:
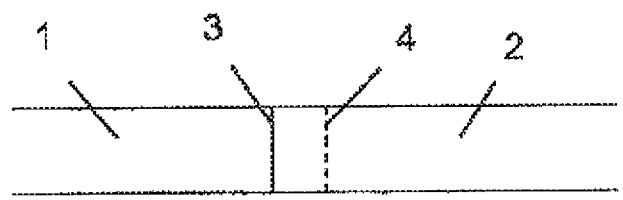
FIG. 1 is a plan view illustrating a splice of the sealing strip according to the prior art.

In the prior art splicing, as indicated in FIG. 1, a first sealing strip 1 and a second sealing strip 2 are each cut transversely, i.e. 90° in relation to the longitudinal direction of respective sealing strip 1, 2. Thus, each sealing strip 1, 2 has a straight transverse edge 3, 4. The end areas of the sealing strips 1, 2 are then placed above one and another, with an overlapping area of about 7-10 mm, and finally fused together by heating from two sides. The overlapping area is shown between the lines 3 and 4 in FIG. 1.

Figure 2:
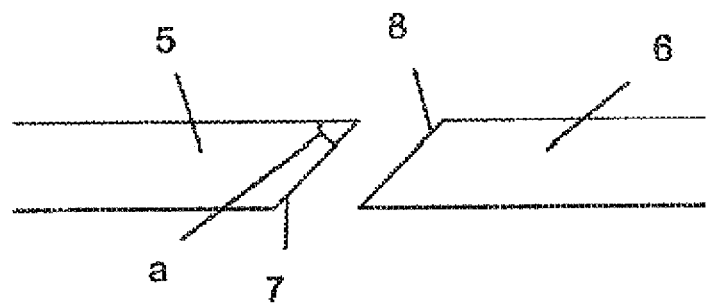
FIG. 2 is a plan view of two sealing strips cut to be spliced according to the present invention.
Figure 3:
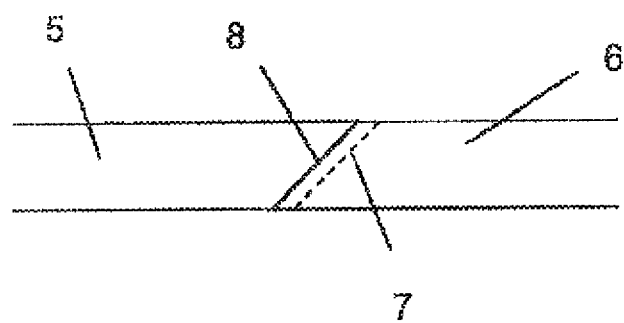
FIG. 3 is a plan view of a splice formed of the two sealing strips of FIG. 2.

In FIG. 2 a first and a second sealing strip 5, 6 are shown. Each sealing strip 5, 6 has an oblique end 7, 8. In the shown embodiment the oblique ends 7, 8 are cut at an angle a of about 45° to the longitudinal direction of respective sealing strip 5, 6. Even though the invention works well with oblique ends having an angle of 45°, a person skilled in the art realises that it will also work with oblique ends having other angles. The smaller the angle a is, the longer the oblique ends will be. A long oblique end may be difficult to handle in a proper way. In practice it has shown that if the angle a of the oblique ends is in the interval of about 25°-55° the result will be good and the oblique ends will be manageable. However, theoretically the splice will be better the smaller the angle a is.

According to the present invention one end of the first sealing strip 5 is spliced to one end of the second sealing strip 6. The first step in forming the splice is that the ends of the sealing strips 5, 6 are cut in such a way that respective oblique edge 7, 8 forms an angle of about 45°, seen in plan view. The ends of the sealing strips 5, 6 are then brought together with one end on top of the other end. The sealing strips 5, 6 are placed forming an oblique overlapping area having a length of approximately 3 mm, seen in the longitudinal direction of the sealing strip. A person skilled in the art realises that the length of the oblique overlapping area could vary, but it should be held relatively short and preferably be in the interval of 2-4 mm. Then heating is applied on one side at the area of the splice, whereby the two sealing strips 5, 6 are fused together. In one embodiment the heat is applied by a standardized sealing means, having a heating band with Teflon on the side facing the sealing strip. A temperature of about 125° C. is applied for about 2.5 s. By applying a relatively low temperature for a relatively extended period of time a better through heating of the splice is achieved, compared to previous methods. By the relatively low but extended heating it suffices to apply the heat on only one side of the spliced area. The formed overlapping area extends between the oblique ends 7, 8 of the first and second sealing strips 5, 6. Thus, the overlapping area forms an oblique band.

The formed sealing strip will have double thickness in the oblique overlapping area. As the overlapping area forms a relatively thin oblique band, the spliced sealing strip will only have double thickness at a part of an imaginary transverse line crossing the sealing strip at right angle, i.e. 90° in relation to the longitudinal direction of the sealing strip. Thereby the sealing strip will bend relatively smoothly reducing the risk of troubles caused by the overlapping area of the spliced sealing strip.

Figure 4:
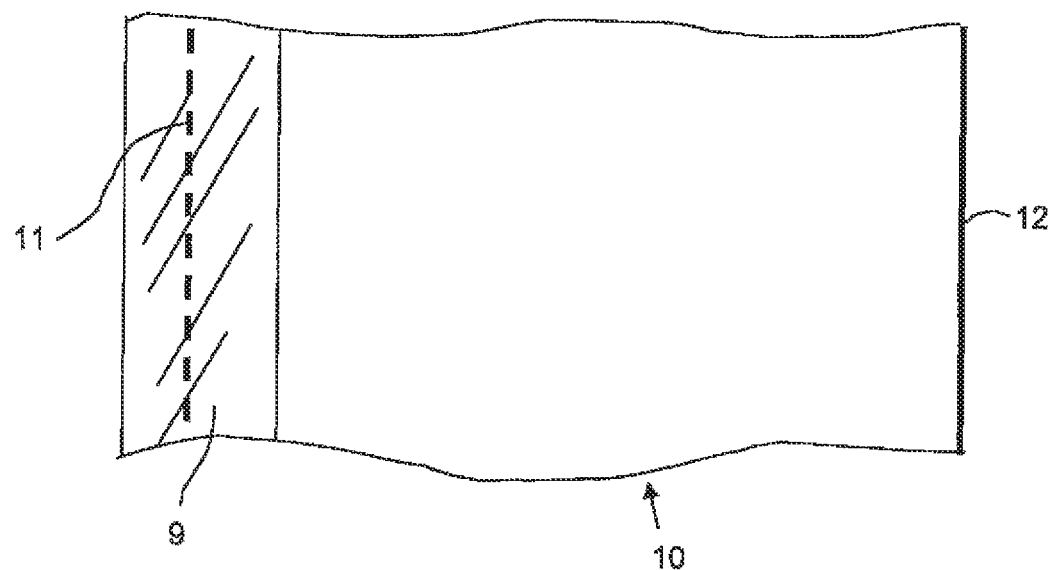
FIG. 4 is a plan view of a part of a packaging web provide with a sealing strip.

FIG. 4 shows one example of a packaging material web 10, to which a sealing strip 9 is attached. The sealing strip 9 is partly attached to the packaging material web 10 at a first edge 11 of the packaging material web 10, which first edge 11 of the packaging material web 10 is indicated by a dashed line in FIG. 4. Thus, the sealing strip 9 goes in a short distance on the packaging material web 10 and has a free part parallel with and outside the first edge 11 of the packaging material web 10. A second edge 12 of the packaging material web 10 opposite the first edge 11 is also shown in FIG. 4.

Figure 5:
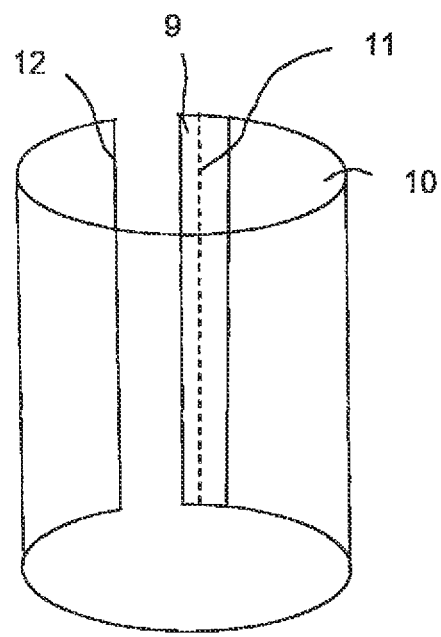
FIG. 5 is a schematic view, partially transparent, of a packaging material web provided with a sealing strip and in the process of being reformed into a tube.

FIG. 5 schematically illustrates a phase in which the packaging material web 10 is reformed in a filling machine into a tube, in the production of packaging containers. As indicated above the sealing strip 9 is applied on and sealed to the first longitudinal edge 11 of the packaging material web 10, with the free part of the sealing strip projecting from the first longitudinal edge 11. As the packaging material web 10 is formed into a tube the free part of the sealing strip 9 will receive the second edge 12 of the packaging material web 10. The sealing strip 9 is sealed to the inside of the overlapping second longitudinal web edge in order to cover completely and protect the inwardly facing liquid-wicking incision edge of paper or paperboard against liquid penetration (edge wicking).

While the present invention has been described above with reference to specific embodiments and applications, it is naturally not restricted exclusively to these illustrated and described embodiments. It will be obvious to a person skilled in the art, in the possession of the knowledge of the present invention, that numerous modifications, alterations and variations are possible without departing from the scope of the inventive concept as this is defined in the appended claims.

The invention claimed is:

1. A method involving splicing two sealing strip end portions to form a spliced sealing strip to cover longitudinal edges of a packaging material web, which packaging material web is subsequently sealed and folded to form packaging containers for liquid foods, the method comprising:
   cutting each of the two sealing strip end portions to be spliced so that each sealing strip end portion possesses an oblique edge oriented at an oblique angle to longitudinal sides of the respective sealing strip end portion, the two sealing strip end portions each possessing a single thickness;
   placing one of the single thickness sealing strip end portions on top of the other single thickness sealing strip end portion to form an overlap between the oblique edges of the two sealing strip end portions, and fixing the overlapping oblique edges of the two sealing strip end portions relative to one another to form the spliced sealing strip, the spliced sealing strip possessing a double thickness at the overlap between the oblique edges of the two sealing strip end portions; and
   placing the spliced sealing strip with the double thickness overlap at one of the longitudinal edges of the packaging material web to allow the packaging material web to be subsequently sealed and folded to form the packaging containers.

2. The method of claim 1, wherein the oblique edge of each of the two sealing strip end portions forms an angle of 25°-55° in plan view.

3. The method of claim 2, wherein the oblique edge of each of the two sealing strip end portions forms an angle of about 45° in plan view.

4. The method of claim 1, wherein an overlapping area of the oblique edges of the two sealing strip end portions forms an oblique band having a length of 3±1 mm.

5. The method of claim 4, further comprising fusing parts of the two sealing strip end portions in the overlapping area together by heating at the overlapping area.

6. The method of claim 5, wherein the heating is applied from one side only.

7. The method of claim 5, wherein the heating temperature used is 125° C.

8. The method of claim 7, wherein the heating is applied for about 2.5 s.

9. The method of claim 1, further comprising placing a part of the spliced sealing strip at an other one of the longitudinal edges of the packaging material web.

10. A method involving forming a spliced sealing strip configured to cover longitudinal edges of a packaging material web that is subsequently sealed and folded to form packaging containers containing liquid foods, the method comprising:
    cutting a first sealing strip end portion, the first sealing strip end portion possessing a length, a width and a thickness, the cutting of the first sealing strip end portion producing an oblique first edge on the first sealing strip end portion that extends obliquely relative to the length and the width of the first sealing strip end portion;
    cutting a second sealing strip end portion, the second sealing strip end portion possessing a length, a width and a thickness, the cutting of the second sealing strip end portion producing an oblique second edge on the second sealing strip end portion that extends obliquely relative to the length and the width of the second sealing strip end portion;
    overlapping a single thickness part of the first sealing strip end portion inclusive of the oblique first edge and a single thickness part of the second sealing strip end portion inclusive of the oblique second edge in a direction of the thicknesses of the first and second sealing strip end portions to produce an overlap of double thickness, and fixing the overlapping oblique edges of the first and second sealing strip end portions relative to one another to form the spliced sealing strip; and
    placing the spliced sealing strip with the double thickness overlap at one of the longitudinal edges of the packaging material web to allow the packaging material web to be subsequently sealed and folded to form the packaging containers.

11. A method of applying a spliced sealing strip to packaging material that is subsequently sealed and folded to form a packaging container, the method comprising:
    cutting each of two sealing strip end portions to be spliced so that each sealing strip end portion possesses an oblique edge oriented at an oblique angle to longitudinal sides of the respective sealing strip end portion, each of the two sealing strip end portions possessing a single thickness;
    placing one of the single thickness sealing strip end portions on top of the other single thickness sealing strip end portion to form a double thickness overlap between the oblique edges of the two sealing strip end portions, and fixing the overlapping oblique edges of the two sealing strip end portions relative to one another to form the spliced sealing strip; and
    placing the spliced sealing strip with the double thickness overlap at a longitudinal edge of the packaging material to allow the packaging material to be subsequently sealed and folded to form the packaging container.

* * * * *